(12) United States Patent
Garbo

(10) Patent No.: US 6,214,399 B1
(45) Date of Patent: Apr. 10, 2001

(54) APPARATUS AND METHOD FOR MOLDING FOOD

(76) Inventor: Paul W. Garbo, 48 Lester Ave., Freeport, NY (US) 11520-5913

(*) Notice: Subject to any disclaimer, the term of this patent is extended or adjusted under 35 U.S.C. 154(b) by 0 days.

(21) Appl. No.: 09/568,241

(22) Filed: May 9, 2000

(51) Int. Cl.[7] .................. A23L 1/00; A23P 1/00; B29C 43/00

(52) U.S. Cl. ............... 426/505; 99/349; 99/353; 99/373; 99/439; 425/394; 426/512; 426/523

(58) Field of Search ............ 426/505, 512, 426/523; 99/349, 353, 373, 377, 439; 425/394

(56) References Cited

U.S. PATENT DOCUMENTS

| | | | |
|---|---|---|---|
| 5,376,395 | * 12/1994 | Pels | 99/349 |
| 5,960,705 | * 10/1999 | D'Alterio et al. | 426/523 |
| 6,004,602 | * 12/1999 | D'Alterio | 426/523 |

* cited by examiner

Primary Examiner—George C. Yeung
(74) Attorney, Agent, or Firm—Paul W. Garbo

(57) ABSTRACT

A simple apparatus for molding and baking food in particulate or fluid form into edible unified products comprises a heated mold bottom with a cavity or recess, a base member at the bottom of the recess which can be pushed up by a rod that slides through the mold bottom, and a heated mold top that can be alternately brought down on, and lifted off, the mold bottom. By placing a measured quantity of food particles in the mold recess and bringing the mold top down in pressing contact with the mold bottom, the food particles are compressed for a selected baking period. The mold top is then raised away from the mold bottom and the base member is pushed up to eject the resulting unified product from the mold recess. The mold recess may be shaped to provide a snug fit with a preformed aluminum foil mold placed therein to produce unified food in a foil mold.

16 Claims, 2 Drawing Sheets

APPARATUS AND METHOD FOR MOLDING FOOD

BACKGROUND OF THE INVENTION

This invention relates to an apparatus and method of molding food in particulate or fluid form into edible coherent products. More particularly, the invention involves compressing and baking such food to yield shaped products such as pie shells.

Illustrative of an apparatus and method for molding pieces of food into a unified product is U.S. Pat. No. 5,960,705 to D'Alterio and Garbo. The patent discloses the formation of discrete pieces of cooked food with a binding composition into a desired shape, such as the base or shell of a pizza. Applicant's copending application Ser. No. 09/369,161, filed Aug. 5, 1999, also describes the conversion of food particles into a unified product in an aluminum foil mold.

The aforesaid patent discloses a three-part mold: a fixed ring, a bottom plate slidably fitted in the ring, and a top plate that can be alternately pressed against the ring and lifted therefrom. The copending application also shows a three-part back-up mold for holding a aluminum foil mold in which food particles are compressed and baked. In both cases, the slidable bottom plate fitted in the fixed ring is a thick, heavy metal body that is heated and is reciprocated within a heated fixed ring.

The design of such an apparatus requires careful dimensioning and selection of metals for the fixed ring and bottom plate to ensure proper reciprocation of the bottom plate when both plate and ring are hot, say at 450°F. Moreover, some foods contain juices that during the compression and baking period ooze out and wet the sliding surfaces between the bottom plate and ring. In such cases, the juices become encrusted on the sliding surfaces, thus requiring frequent shut-down of production to permit clean-up of the encrusted surfaces.

Accordingly, a principal object of the invention is to provide a simpler apparatus and method for compacting and heating food particles into edible unified shapes.

Another important object is to provide an apparatus with a reciprocable member that is light and does not require sliding contact with a fixed member.

A further object is to provide apparatus that requires less frequent cleaning and is easier to clean.

These and other features and advantages of the invention will be apparent from the description which follows.

SUMMARY OF THE INVENTION

In accordance with this invention, an apparatus for molding and heating food particles into a unified shaped product comprises a heated stationary mold bottom with a cavity or recess for receiving a measured quantity of food particles, a base member in the recess of the mold bottom, and a heated mold top that can be alternately brought down on, and lifted off, the heated mold bottom. The base member in the mold bottom can be moved up to push a unified food product out of the mold bottom and then pulled down to receive food particles for the start of another molding cycle.

When the base member is pulled down against the bottom of the recess in the mold bottom by a piston rod extending through the mold bottom, a desired amount of food particles deposited in the recess can be compressed and baked by bringing the mold top down on the mold bottom. At the end of the baking period, the mold top is moved up away from the mold bottom and the base member is pushed up so that its top face is at least flush with, or above, the top surface of the mold bottom. Thereupon, the thus formed, coherent food product can be simply pushed off the base member onto a chute or conveyor belt.

The base member can then be pulled down against the bottom of the recess in the mold bottom so that another measured amount of food particles can be dropped in the recess to start again the cycle of compressing and cooking the food particles into a unified edible product.

The top face of the base member is preferably flat to facilitate the removal of the coherent food product formed thereon simply by pushing the product horizontally. Of course, the top face may have slight curvature and/or a slightly indented pattern that will not interfere with the removal of the shaped food product therefrom by a horizontal push.

The bottom or molding face of the mold top can be flat, concave or convex. A convex face, e.g., one with a protrusion having a periphery smaller than the periphery of the recess in the mold bottom, will form a unified food product shaped like a shallow pan with a turned-up lip. A mold top with a concave molding face will yield a product shaped like a meringue pie. In short, the molding face of the mold top can have many contours.

While the recess of the mold bottom is usually circular in its simplest embodiment, it may be oval, square, oblong or other desired shape, e.g., heart shape. The base member at the bottom of the recess may cover all or part of the recess bottom.

While the heating of the mold top and mold bottom can be achieved with steam or other heating fluid, or even with gas burners, electrical heaters are preferred for structural simplicity and ease of temperature control. While electrical heating elements can be attached to the exterior portions of the mold top and mold bottom, they are frequently embedded in these mold parts. Aluminum is the preferred metal, but other metals such as stainless steel may be substitutes. When the mold parts are formed of thick aluminum stock, it may be drilled to provide cavities into which electrical heating elements are fitted. Another way of embedding the heating elements is to mill grooves or cavities in the exterior portions of the mold parts so that the heating elements can be laid therein. Regardless of how heating is effected, insulation should cover all exterior portions of both mold parts to reduce heat losses and prevent burns to workers.

There are many types of food particles that can be molded into coherent shaped products. To begin with, the term "particles" as used herein is intended to embrace discrete matter ranging in size from about a grain of rice to a pasta shape such as ziti, preferably not exceeding about 3 inches in length. Chopped meat, fish, vegetables, etc., together with binding agents such as eggs and edible gums are additional examples. Some foods tend to stick to the molding faces. A Teflon coating on the molding faces is often adequate to overcome the problem. Chromium plating is another way of eliminating the stickiness of some foods to the molding faces.

Basically, the vertical movements of the mold top and the base member can be effected manually. However, the simplicity of the movements makes it obvious that various known mechanical means can be used to eliminate manual labor. For example, pneumatic pistons are simple and quick-acting means for achieving the required movements of both parts. Rack and pinion or a motor-driven screw can also produce the piston-like movements of both parts. Through the use of mechanical means actuated electrically, pneumatically, hydraulically or magnetically, the apparatus of the invention is easily automated by a timing device that causes the sequential movements of the mold top and the base member and even means for supplying a measured amount of food particles in the mold bottom as well as means for displacing the molded product from the base member in its raised position. In short, the apparatus of the invention is ideally suitable for large-scale production of molded food products.

BRIEF DESCRIPTION OF THE DRAWINGS

For further clarification of the invention, the following description will refer to the appended drawings of which.

DESCRIPTION OF PREFERRED EMBODIMENTS

Figure 1:
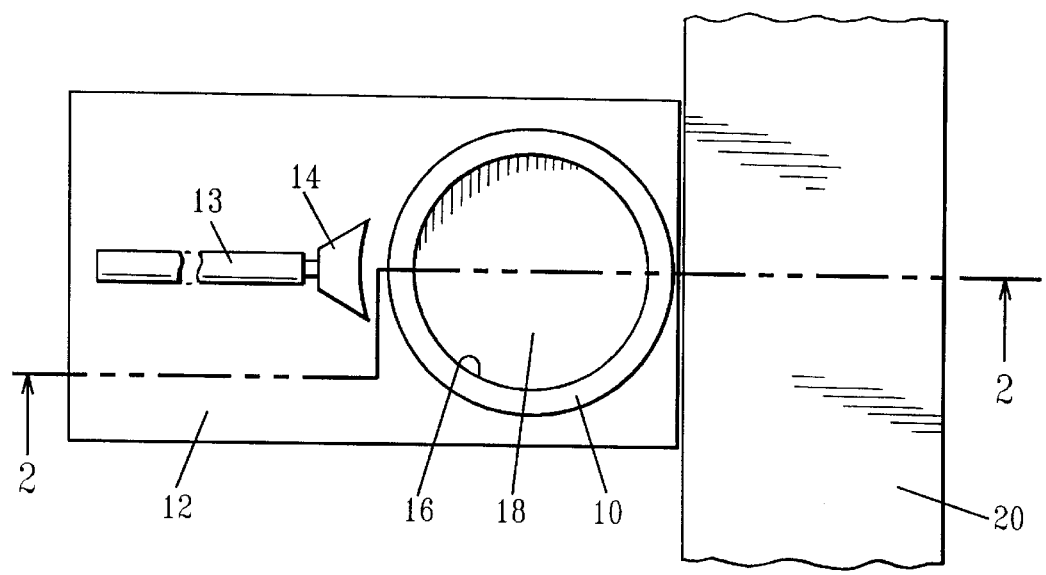
FIG. 1 is a diagrammatic plan view of a simple embodiment of the apparatus of the invention, omitting the mold top.
Figure 2:
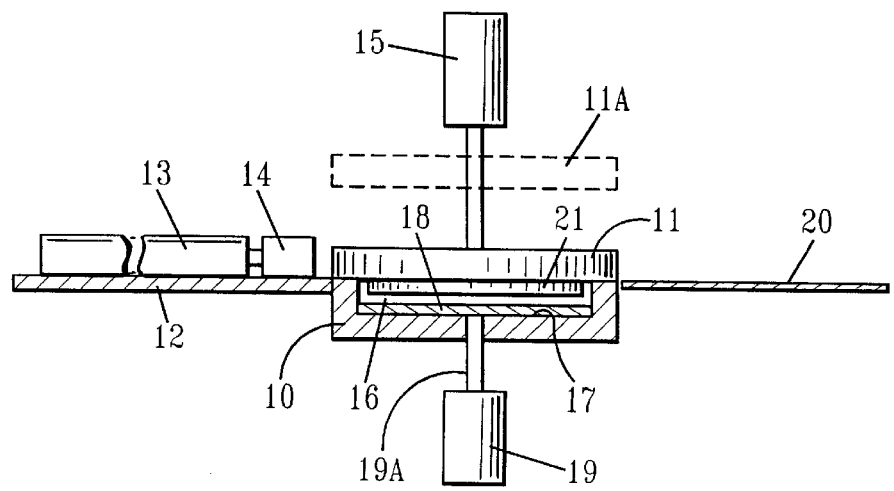
FIG. 2 is a diagrammatic sectional view taken along the line 2—2 of FIG. 1, including the mold top positioned for the baking period.

FIG. 1 and FIG. 2 show the basic components of the apparatus of the invention, namely, mold bottom 10 positioned directly below mold top 11 and level with a table 12 which supports pneumatic piston 13 having arched pusher 14 mounted on its piston rod. Mold top 11 is connected to the piston rod of pneumatic piston 15 which can move mold top 11 up and down. Mold bottom 10 has a cylindrical recess 16 with a flat bottom 17.

A distinct feature of the invention is base member 18, a metal disk that fits in recess 16 and is connected to piston rod 19A of pneumatic piston 19. Piston rod 19A passes slidably through mold bottom 10 and serves to raise base member 18 to at least the top surface of mold bottom 10 or higher, and thus lift the molded food product sufficiently so that piston 13 with pusher 14 can move the food product onto conveyor belt 20 which is positioned adjacent table 12. With the food product thus delivered to conveyor 20, the rods of pistons 13, 19 are retracted and mold bottom 10 is ready to receive a measured quantity of food particles.

As soon as food particles are deposited in recess 16 of mold bottom 10, mold top 11 is brought down against mold bottom 10 by piston 15. While the molding face of mold top 11 may be flat, it is shown in FIG. 2 with a cylindrical protrusion 21, its diameter being a little smaller than that of recess 16. Thus, at the end of a selected baking period, say 50 seconds at a temperature of 450°F., mold top 11 is lifted by piston 15 and the molded food product in the shape of a shallow pan with a turned-up rim is lifted out of recess 16 by base member 18 driven by piston 19. Again piston 13 is activated so that pusher 14 moves the molded food product off base member 18 and onto conveyor 20.

As previously explained, both mold parts 10, 11 are preferably electrically heated by elements (not shown) embedded in, or attached to, the massive aluminum which usually forms mold parts 10,11. It is obvious that piston 19 would be anchored to the floor and piston 15 would be suspended from the ceiling or other overhead rigid structure. Mold top 11 is shown by phantom lines 11A in the raised position while a molded food product is lifted out of mold bottom 10 by base member 18 and pushed off member 18 onto conveyor 20, whereupon base member 18 drops down in recess 16 and a measured quantity of food particles is deposited in recess 16 to start another molding and baking cycle.

The described molding operation conducted with the apparatus of FIGS. 1 and 2 can also form unified food products in preformed aluminum foil molds as taught in copending application Ser. No. 09/369,161. Of course, when it is desired to produce molded food in aluminum foil molds, the operation of the apparatus of FIGS. 1 and 2 requires only the insertion of a preformed aluminum foil mold in recess 16 with base element 18 fully retracted in mold bottom 10. Food particles may be deposited in the foil mold before or after it is placed in recess 16. No other change is required to mold food in aluminum foil molds.

Moisture and other liquids in food generate pressure during the baking period at high temperature. To prevent the development of troublesome gas pressure, the mechanical pressure of mold top 11 against mold bottom 10 to maintain a tight seal therebetween is diminished for a few seconds to allow volatiles to escape. Several brief ventings may be required. When an aluminum foil mold is present, some venting occurs because the flange of the foil mold which is sandwiched between mold parts 10, 11 prevents a perfect seal.

Figure 3:
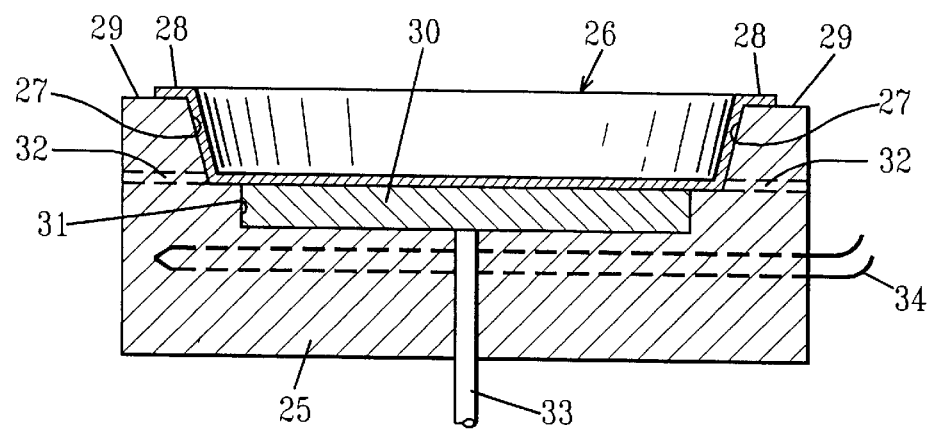
FIG. 3 is a diagrammatic sectional view of a mold bottom holding a preformed aluminum foil mold.

FIG. 3 shows in cross-section mold bottom 25 with preformed aluminum foil mold 26 placed in recess 27 with flange 28 of foil mold 26 against top surface 29 of mold bottom 25. At the bottom of recess 27 is base member 30 in the form of a metal disk. While disk 30 may be coextensive with the entire bottom of recess 27, it is shown in FIG. 3 as being smaller and fitting in another recess 31 so that the top face of disk 30 is flush with the bottom of recess 27.

Especially with food particles and binding agents having a high content of moisture and other volatiles, the aluminum foil mold preferably has a multiplicity of needle punctures or fine perforations that can vent gases generated during the baking of the food under compression. Gases leaving foil mold 26 can travel between foil mold 26 and recess 27 and escape at foil flange 28 sandwiched between mold bottom 25 and a mold top similar to that shown in FIG. 2. A few holes 32 through mold base 25 to recess 27 are advisable for venting gases of foods with high contents of moisture and other volatiles.

Base member 30 is connected to piston rod 33 that slides through a bore in mold bottom 25 and is raised by a pneumatic piston (not shown) to a level that makes it possible to push foil mold 26 with its content of unified food away from mold base 25. Thereupon, base member 30 is retracted by piston rod 33 and recess 27 of mold bottom is again ready to receive a preformed aluminum foil mold 26 and food particles so that the cycle of compressing and baking the food particles can be repeated. Wires 34 are a simple representation of electrical heating means to bring the temperature of mold bottom 25 up to the selected baking level. The mold top, like mold top 11 of FIG. 2, would similarly have electrical heating means 34.

Figure 4:
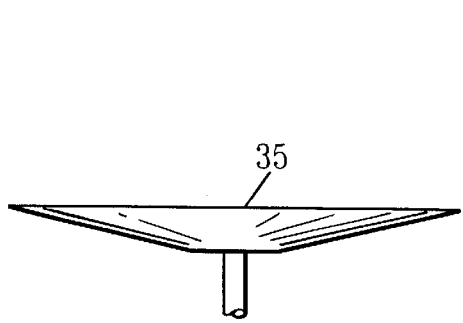
FIG. 4 is an elevational view of a base member.
Figure 5:
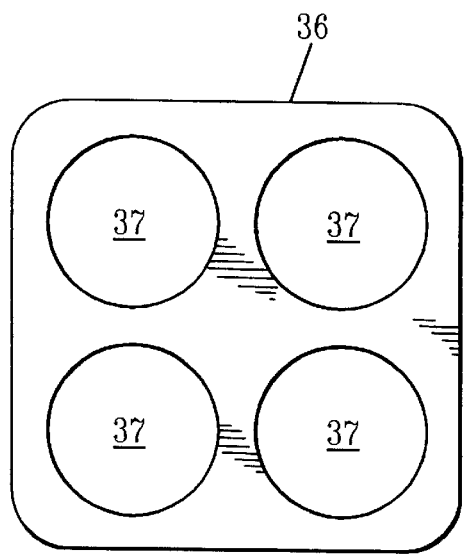
FIG. 5 is a top view of another base member.
Figure 6:
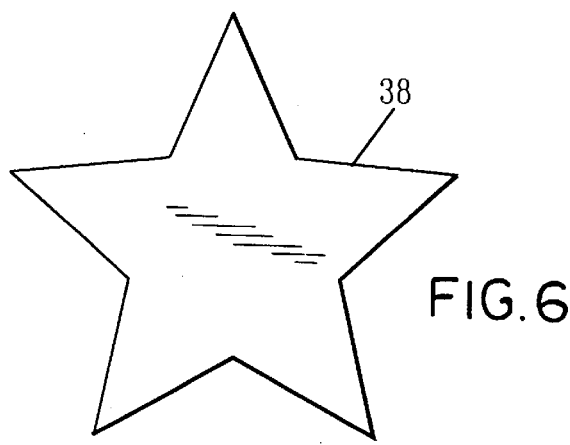
FIG. 6 is a top view of still another base member.

Base member 30 is a metal disk of uniform thickness but may vary in several ways. FIG. 4 shows a base member 35 which in profile is thickest in the central portion and tapers down toward its periphery. Base member 36 of FIG. 5 has a square face with rounded corners and circular openings 37 extending therethrough. In FIG. 6, base member 38 is shaped somewhat like a five-pointed star. Whatever form of base member is selected, the bottom of the recess in the mold bottom should be contoured to provide a substantially perfect or snug fit between the base member and the recess bottom. Thus, the recess bottom to receive base member 36 would have an additional recess with a periphery matching that of member 36. The recess bottom would also have four cylindrical protrusions to fit in circular openings 37 and thus provide a smooth surface that will contact the entire bottom of a preformed foil mold placed in the mold bottom.

Similarly, a mold recess for base member 38 would be indented to fit member 38 and thus provide a smooth surface to contact the entire bottom of a foil mold placed in the mold recess. Base members like 36 and 38 that do not form substantially all of the bottom of the mold recess as shown in FIG. 2 are not usually employed if the food particles are compressed and baked without using an aluminum foil mold. In summary, the base member should have high thermal conductivity, e.g., aluminum, and should have as perfect a nesting fit in the bottom of the recess in the mold bottom as possible to obtain good heat flow from the mold bottom to and through the base member.

At the start of each molding cycle, the mold top is raised sufficiently not only for the removal of a molded food product with or without an aluminum foil mold from the mold bottom, but also for the introduction of food particles directly into the recess of the mold bottom or into a foil mold that is seated in that recess.

Copending application Ser. No. 09/369,11, the teachings of which are incorporated herein, points out that the preformed aluminum foil mold may have a "curl" edge instead of the usual, crimped flange shown in FIG. 3. When the foil mold has a "curl" edge, the mold bottom 25 will simply be modified to have a groove in which the "curl" fits. The copending application coined the term, fluid food, to embrace loose granular food particles like boxed stuffing sold in supermarkets, or pieces of cooked pasta such as linguini with a binding agent, or a batter containing nuts, whole grains, etc., or plastic food like mashed potatoes or dough. The term, food particles, used herein is the full equivalent of fluid food for the purposes of this invention.

Many variations and modifications of the invention will be apparent to those skilled in the art without departing from the spirit or scope of the invention. For example, mold bottom 10 or 25 may have two or more recesses, each with a base member that can move up and down, so that several molded food products are made in each compressing and baking cycle. Also, each of mold parts 10, 11, 25 may have a molding face formed of one metal backed up by a different metal. Two or more pistons 15 may be desirable for large mold tops 11. Also, the molding face of mold top 11 may be partly concave and partly convex. Thus, if the border portion is concave and the core portion is convex, the molded food product will, in its upper portion, be doughnut-like in shape. Accordingly, only such limitations should be imposed on the invention as are set forth in the appended claims.

What is claimed is:

1. An apparatus for molding and heating food particles into a coherent, edible product, which comprises a heated mold bottom with a recess, a base member that fits in the bottom of said recess, a rod that slidably passes through said mold bottom and is connected to said base member to raise and retract said base member, and a heated mold top that can be alternately pressed against said mold bottom and lifted therefrom to close and open said recess.

2. The apparatus of claim 1 wherein the mold bottom and the mold top are made of aluminum and each of which has electrical heating elements attached thereto.

3. The apparatus of claim 2 wherein the bottom face of the mold top has a protrusion that dips into the recess of the mold bottom when said mold top is pressed against said mold bottom to close said recess.

4. The apparatus of claim 1 wherein the mold top and the base member are individually reciprocated by pneumatic or hydraulic piston rods.

5. The apparatus of claim 4 wherein the pneumatic or hydraulic piston rods are sequentially activated by a timing device.

6. The apparatus of claim 3 wherein the recess in the mold bottom is cylindrical, and the protrusion of the mold top is cylindrical with a diameter smaller than the diameter of said recess so as to form a coherent product shaped like a pie or pizza shell with a turned-up rim.

7. The apparatus of claim 6 wherein the mold top and the base member are individually reciprocated by pneumatic or hydraulic piston rods.

8. The apparatus of claim 7 wherein the piston rods are sequentially activated by a timing device.

9. The apparatus of claim 2 wherein the base member is made of aluminum, and the rod connected to said base member is reciprocated by pneumatic, hydraulic or magnetic means.

10. The apparatus of claim 9 wherein the recess in the mold bottom is shaped to fit a selected preformed aluminum foil mold placed therein, said fit providing substantially complete contact of the exterior surface of said foil mold with the surface of said recess and the base member therein.

11. The apparatus of claim 10 wherein the mold top is alternately pressed against and lifted from the mold bottom by a pneumatic or hydraulic piston rod, and said mold top has a protrusion that dips into the recess of said mold bottom when said mold top is pressed against said mold bottom to close said recess.

12. The apparatus of claim 11 wherein the recess in the mold bottom and the protrusion of the mold top are cylindrical, the diameter of said protrusion being smaller than the diameter of said recess so as to form a coherent product shaped like a pie or pizza shell in an aluminum foil mold.

13. The apparatus of claim 12 wherein the mold bottom has small channels extending from the recess to the exterior of said mold bottom for venting gases generated in said recess.

14. A method of compressing and baking food particles under pressure to form an edible, unified product, which comprises depositing said food particles in a recess of a mold bottom with or without a preformed aluminum foil mold snugly fitted in said recess, pressing a mold top against said mold bottom, heating said mold bottom and mold top to bake said food particles under pressure for a period selected to convert said food particles into said unified product, lifting said mold top, and pushing said unified product out of said recess with a base member disposed in the bottom of said recess and connected to a reciprocative rod extending through the bottom of said mold bottom.

15. The method of claim 14 wherein the recess is cylindrical, the mold top has a smaller cylindrical protrusion that dips into said recess when said mold top is pressed against the mold bottom to form a unified product shaped like a pie or pizza shell.

16. The method of claim 15 wherein the food particles are cooked pieces of pasta selected from the group consisting of spaghetti, linguini, fettuccine and noodles admixed with a binding agent.

* * * * *